United States Patent
Lunt et al.

(10) Patent No.: US 12,220,615 B2
(45) Date of Patent: Feb. 11, 2025

(54) METHOD, DEVICE AND COMPUTER SOFTWARE FOR DETERMINING A RELATIVE PERFORMANCE MEASURE BETWEEN AT LEAST TWO PLAYERS IN A SPORT

(71) Applicants: Sony Group Corporation, Tokyo (JP); Sony Europe B.V., Weybridge (GB)

(72) Inventors: Matthew Lunt, Basingstoke (GB); Paul Martin Hawkins, Basingstoke (GB)

(73) Assignees: Sony Group Corporation, Tokyo (JP); Sony Europe B.V., Weybridge (GB)

( * ) Notice: Subject to any disclaimer, the term of this patent is extended or adjusted under 35 U.S.C. 154(b) by 0 days.

(21) Appl. No.: 17/444,077

(22) Filed: Jul. 30, 2021

(65) Prior Publication Data

US 2022/0047917 A1  Feb. 17, 2022

(30) Foreign Application Priority Data

Aug. 12, 2020 (GB) ..................... 2012525

(51) Int. Cl.
*A63B 24/00* (2006.01)
*A63B 71/06* (2006.01)
*A63B 102/02* (2015.01)

(52) U.S. Cl.
CPC ...... *A63B 24/0062* (2013.01); *A63B 24/0021* (2013.01); *A63B 71/0622* (2013.01); *A63B 71/0686* (2013.01); *A63B 2024/0025* (2013.01); *A63B 2024/0028* (2013.01); *A63B 2024/0068* (2013.01); *A63B 2102/02* (2015.10); *A63B 2220/05* (2013.01); *A63B 2220/20* (2013.01); *A63B 2220/35* (2013.01); *A63B 2220/62* (2013.01)

(58) Field of Classification Search
CPC ............ A63B 24/0062; A63B 24/0021; A63B 71/0622; A63B 71/0686; A63B 2102/02; A63B 2024/0025; A63B 2024/0028; A63B 2024/0068; A63B 2220/05; A63B 2220/20; A63B 2220/35; A63B 2220/62
See application file for complete search history.

(56) References Cited

U.S. PATENT DOCUMENTS

| | | | |
|---|---|---|---|
| 6,925,851 B2 * | 8/2005 | Reinbold | A63B 71/06 73/12.09 |
| 9,737,784 B1 | 8/2017 | Kliebhan et al. | |
| 10,065,074 B1 * | 9/2018 | Hoang | G01P 1/02 |
| 10,124,210 B2 * | 11/2018 | Mather | G06V 40/28 |
| 11,399,589 B2 * | 8/2022 | Bologna | A42C 2/00 |
| 2007/0135243 A1 * | 6/2007 | LaRue | H04Q 9/00 473/467 |

(Continued)

FOREIGN PATENT DOCUMENTS

FR  3 077 213 A1  8/2019

*Primary Examiner* — Malina D. Blaise
(74) *Attorney, Agent, or Firm* — Oblon, McClelland, Maier & Neustadt, L.L.P.

(57) ABSTRACT

A method for determining a relative performance measure between at least two players in a sport, comprising: receiving position information relating to each of the players and a sporting projectile as each player hits or receives the sporting projectile, and determining, based on an analysis of the position information, the relative performance measure between the players.

18 Claims, 10 Drawing Sheets

(56) References Cited

U.S. PATENT DOCUMENTS

| | | | |
|---|---|---|---|
| 2007/0155488 A1* | 7/2007 | Kubota | A63F 13/352 |
| | | | 463/29 |
| 2010/0030350 A1* | 2/2010 | House | G06V 20/40 |
| | | | 700/91 |
| 2014/0058992 A1* | 2/2014 | Lucey | G06N 5/043 |
| | | | 707/E17.089 |
| 2014/0266160 A1* | 9/2014 | Coza | A63B 47/008 |
| | | | 324/207.11 |
| 2016/0228744 A1* | 8/2016 | Szacherski | A63B 24/0062 |
| 2016/0263458 A1* | 9/2016 | Mather | A63B 24/0062 |
| 2017/0007879 A1 | 1/2017 | Aman | |
| 2018/0154232 A1* | 6/2018 | Gentil | A63B 71/0605 |
| 2019/0009133 A1* | 1/2019 | Mettler May | G09B 19/0038 |
| 2020/0034628 A1* | 1/2020 | Chen | G06T 7/248 |
| 2020/0114240 A1 | 4/2020 | Shachar | |
| 2022/0198799 A1* | 6/2022 | Bacot | G16H 20/30 |

* cited by examiner

Fig. 4

| Action | Variable | Player 1 | Player 2 |
|---|---|---|---|
| Sending | Proximity to ball when ball is hit (m) | x | |
| | Time hitting the ball (s) | x | |
| | Ball speed directly after ball is hit (m/s) | x | |
| | Ball spin directly after ball is hit (/s) | x | |
| | Player pose category | x | |
| Receiving | Distance moved to receiving position (m) | | x |
| | Reaction time (s) | | x |
| | Ball speed directly before ball is hit (m/s) | | x |
| | Ball spin directly before ball is hit (/s) | | x |
| | Player pose category | | x |

Fig. 6

| Action | Variable | Player 1 | Player 2 |
|---|---|---|---|
| Sending | Proximity to ball when ball is hit (m) | x | x |
| | Time hitting the ball (s) | x | x |
| | Ball speed directly after ball is hit (m/s) | x | x |
| | Ball spin directly after ball is hit (/s) | x | x |
| | Player pose category | x | x |
| Receiving | Distance moved to receiving position (m) | x | x |
| | Reaction time (s) | x | x |
| | Ball speed directly before ball is hit (m/s) | x | x |
| | Ball spin directly before ball is hit (/s) | x | x |
| | Player pose category | x | x |

Fig. 8

| Action | Variable | Player 1 (receiving) | Player 2 (sending) |
|---|---|---|---|
| Sending | Proximity to ball at impact (m) | x | |
| | Time hitting the ball (s) | x | |
| | Ball speed after impact (m/s) | x | |
| | Ball spin after impact (/s) | x | |
| | Player pose category | x | |
| Receiving | Distance moved to receiving position (m) | x | |
| | Reaction time (s) | x | |
| | Ball speed before impact (m/s) | x | |
| | Ball spin before impact (/s) | x | |
| | Player pose category | x | |

METHOD, DEVICE AND COMPUTER SOFTWARE FOR DETERMINING A RELATIVE PERFORMANCE MEASURE BETWEEN AT LEAST TWO PLAYERS IN A SPORT

BACKGROUND

Field of the Disclosure

The present disclosure relates to a method, device and computer software for determining a relative performance measure between two players in a sport.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In sport, it is often desirable to identify whether a certain action of a player was made 'under pressure' from another player. An example of this is when, in tennis, a player scores a point due to their opponent failing to return the ball. In this scenario it is desirable to determine whether the opponent's failure to return the ball, and therefore the point scored, was more heavily influenced by the scoring player performing particularly well or by the opponent performing particularly poorly. The result of this determination may be used in match analysis, for example in producing match highlights that are then broadcast to an audience. An aim of this disclosure is to facilitate automation of this process, which is currently carried out manually.

SUMMARY

The present disclosure relates to a method for determining a relative performance measure between two players in a sport, comprising: Receiving position information relating to each of the players and a sporting projectile as each player hits or receives the sporting projectile, and Determining, based on a comparison of the position information, the relative performance measure between the players.

Embodiments of the disclosure are defined by the remaining claims.

BRIEF DESCRIPTION OF THE DRAWINGS

Non-limiting embodiments and advantages of the present disclosure will be best understood by reference to the following detailed description taken in conjunction with the accompanying drawings, wherein:

FIG. 4 is a table showing how variables from received position information and time information relating to each of the players and the ball in the first time period may be stored;

FIG. 6 shows the table from FIG. 4 where variables from received position information and time information relating to each of the players and the ball in the first time period and the second time period are stored;

FIG. 8 is a table showing how variables from received position information and time information relating to each of the players and the ball in the alternate first time period may be stored.

DETAILED DESCRIPTION OF THE EMBODIMENTS

Figure 1:
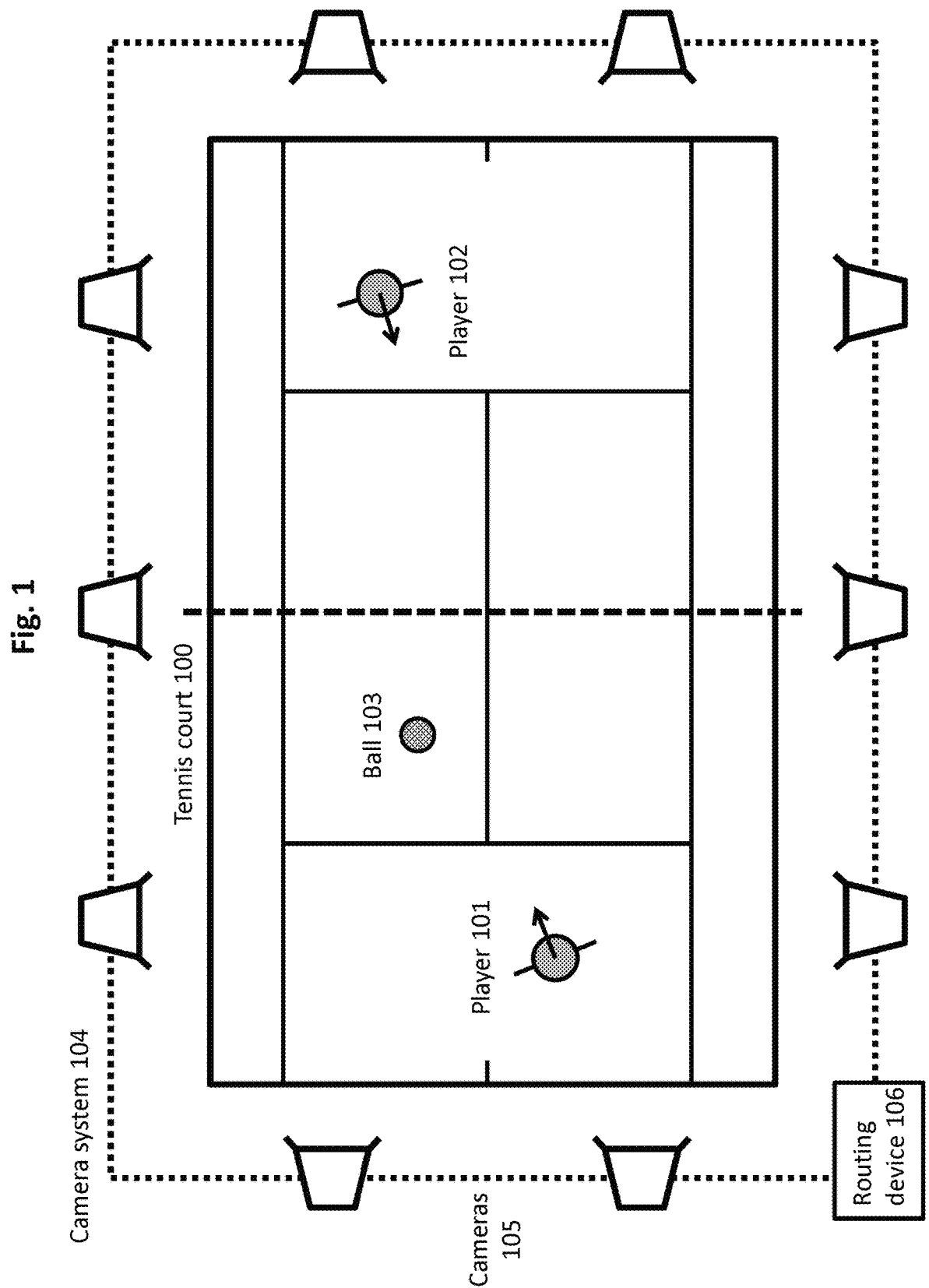
FIG. 1 shows a tennis court on which two players are playing tennis with a tennis ball.

FIG. 1 shows a tennis court 100 on which two players, player 101 and player 102, are playing tennis with a tennis ball 103. A camera system 104 such as a system provided by Hawk-Eye® Innovations Ltd is also shown. The camera system 104 comprises a plurality of cameras 105 connected to a routing device 106 via a wired or wireless connection, or a combination of both. The cameras 105 are positioned at different locations surrounding the tennis court 100, capturing images of an area covering at least part of the court. Whilst FIG. 1 shows ten cameras in the camera system 104, the present disclosure is not limited to this and the plurality of cameras 105 may include any number of cameras. The present disclosure may also relate to other sports involving a plurality of players and a sporting projectile, such as volleyball, badminton or the like. The sporting projectile may therefore be a tennis ball such as tennis ball 103 or alternatively a volleyball ball, shuttlecock or the like.

Figure 2:
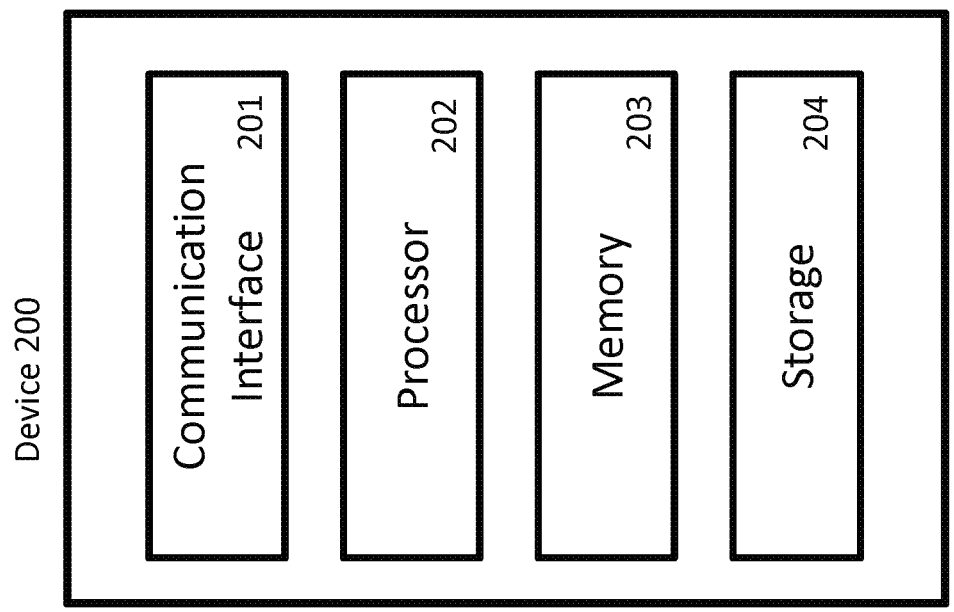
FIG. 2 shows an information processing device according to embodiments.

FIG. 2 shows an information processing device 200 according to embodiments of the present disclosure. The device 200 is configured to perform a series of processes to determine a relative performance measure between players 101 and 102 by means of a method described below. This relative measure may then be used to automate the process of producing match highlights, although the disclosure is not so limited. The device 200 may be incorporated within the routing device 106 or form a separate unit, connected via a wired or wireless connection, or a combination of both.

The information processing device 200 comprises a communication interface 201 for sending electronic information to and/or receiving electronic information from one or more other devices (e.g. receiving position information from the routing device 206, as described later). The device 200 further comprises a processor 202 for processing electronic instructions, a memory 203 for storing the electronic instructions to be processed and input and output data associated with the electronic instructions and a storage medium 204 (e.g. in the form of a hard disk drive, solid state drive, tape drive or the like) for long term storage of electronic information. Each of the communication interface 201, processor 202 and memory 203 are implemented using appropriate circuitry, for example. The circuitry may be embodied as solid state circuitry which may be controlled by software or may be an Application Specific Integrated Circuit. The software comprises computer readable instructions, which when loaded onto a computer or circuitry, configures the computer (or circuitry) to perform a method according to embodiments. The software is stored on the storage medium 204. The processor 202 controls the operation of each of the communication interface 201, memory 203 and storage medium 204.

Figure 3:
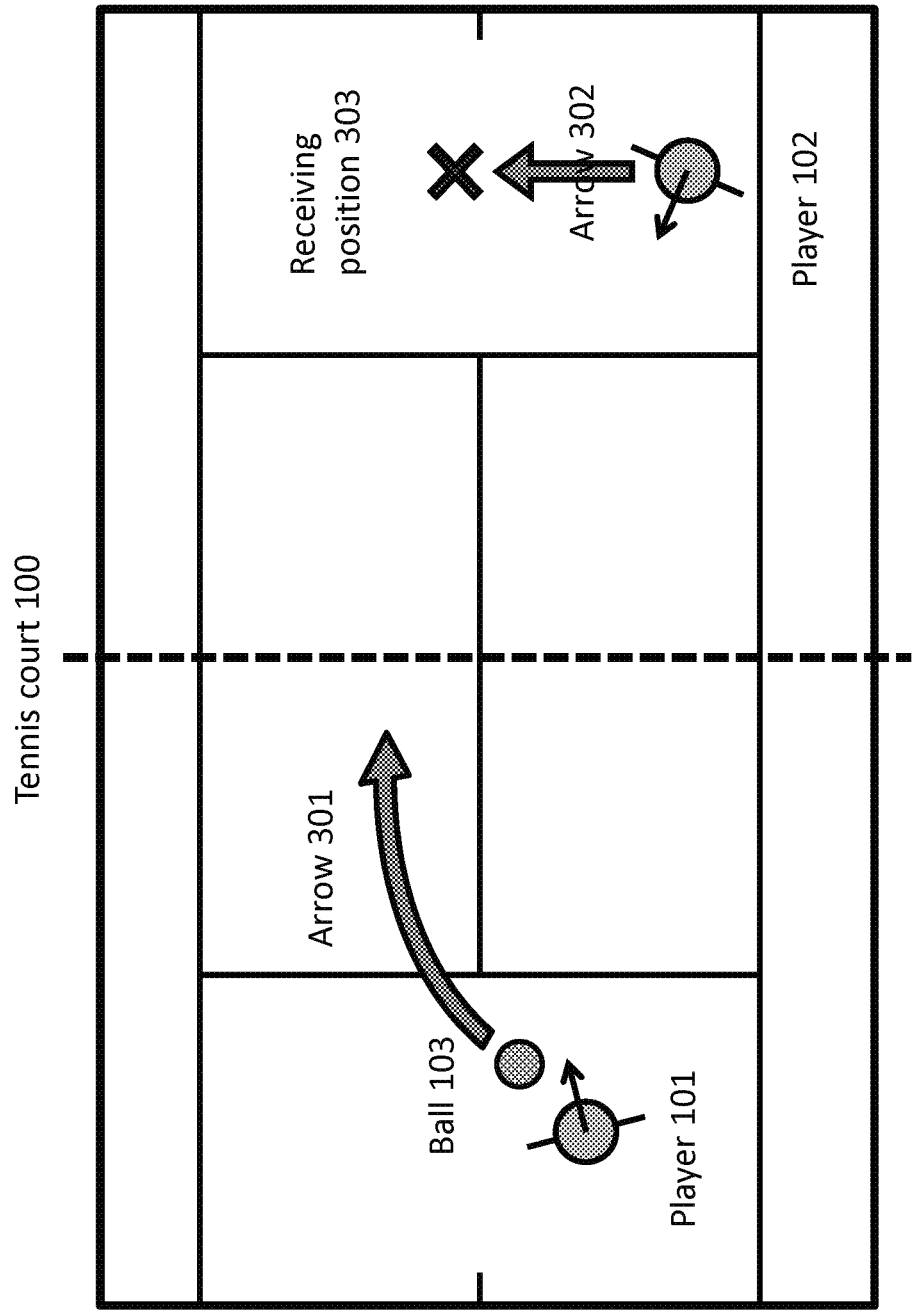
FIG. 3 shows a tennis rally between players on the tennis court during a first time period.

FIG. 3 shows a tennis rally between players 101 and 102 on the court 100 during a first time period, according to embodiments. A time period is defined as a time during which a sending action and/or a receiving action is performed by either or both of the two players. A sending action comprises a player moving to propel a sporting projectile away from themselves, whilst a receiving action comprises moving to intercept the sporting projectile with the intention to next perform a sending action.

In the embodiments depicted in FIG. 3, the first time period is the time in which player 101 performs a sending action and player 102 performs a receiving action. Player 101 performs a sending action by swinging a tennis racket (not shown) and hitting the tennis ball 103 with the racket, propelling the ball towards player 102. The arrow 301 represents the trajectory of the ball 103. Player 102 performs a receiving action by running to intercept the tennis ball 103 with the intention of hitting it back towards player 101 with a tennis racket (not shown). This is also referred to as receiving the ball. The motion of player 102 follows the route represented by arrow 302 to a receiving position 303 on the court. In other embodiments a sending action may comprise throwing a volleyball ball, hitting a shuttlecock with a badminton racket or the like such that the sporting projectile is propelled toward the player performing the receiving action. A receiving action may comprise moving and catching a volleyball ball, moving to intercept a shuttlecock with a badminton racket or the like.

In other embodiments the first time period may be, for example, the time in which one player performs both a sending action and a receiving action. This is discussed later in reference to FIG. 7 and FIG. 8.

During the first time period, images of the area covering at least part of the court 100 are captured by the plurality of cameras 105 and the corresponding image information is sent to the routing device 106. The images are then analysed using image processing techniques to obtain position information relating to each of the players 101 and 102 as well as the tennis ball 103 in the first time period. Image processing techniques used may comprise object detection and tracking, pattern matching or the like to detect the sporting projectile in the image and then this may subsequently be mapped to the real-world position of the sporting projectile on the court. Various such techniques are known in the art and therefore not discussed here. Image analysis may be performed by the routing device 106, wherein the position information obtained is sent to the information processing device 200 via the wired or wireless connection. In other embodiments the routing device 106 may send the image information to the device 200 for the device 200 to perform the image analysis and obtain the position information. In further embodiments, the image information may be sent to a separate device or plurality of devices so that they may perform image analysis and send the position information obtained to the device 200.

Techniques for obtaining position information other than those described here in relation to the figures may be implemented as part of the present disclosure. For example, position information may be obtained via the analysis of other types of information collected in the first time period that relate to players 101 and 102 and the ball 103, such as audio information from recordings taken from the courtside. In other embodiments, the players may wear devices that allow their positions to be identified using global positioning technology or the like.

The position information may comprise, for example, information that indicates the distance travelled by the player receiving the ball during the first time period or allows that information to be calculated. In other embodiments the position information may comprise information indicating the distance between the tennis ball and one of the players at a specified time. For example, such information may indicate the distance between the ball and the player hitting the ball (i.e. how far the player hitting the ball is stretching to hit the ball from their position) and/or the distance between the ball and the player receiving the ball at the time when the ball is hit by the player hitting the ball. The time 'when the ball is hit' may be defined as a point or plurality of points in time chosen from within a certain time period (e.g. 1 second) of when the ball is identified or anticipated to be in contact with the tennis racket of the player hitting the ball. The point or points in time when the ball is identified or anticipated to be in contact with the tennis racket may be determined by image analysis or through audio captured at court side. The time 'when the ball is hit' may further or alternatively comprise a point in time considered to be 'just before/after the player hits the ball', chosen from within a certain time period of when the ball is identified or anticipated to first/last be in contact with the tennis racket. In another example, the position information may comprise information indicating the distance between the tennis ball and the player receiving the ball at a time when the ball first bounces after being hit by the other player. Similarly to the previous example, the time 'when the ball first bounces' may be defined as a point or plurality of points in time chosen in relation to when the ball is identified or anticipated to be in contact with the ground for the first time after being hit. The point or points in time when the ball is identified or anticipated to be in contact with the ground may be determined by image analysis or through audio captured at court side, and the time 'when the ball first bounces' may further or alternatively comprise a point in time considered to be 'just before/after the ball first bounces', chosen from within a certain time period of when the ball is identified or anticipated to first/last be in contact with the ground. In further embodiments the position information may comprise information that indicates the spin of the ball when the ball is hit, calculated from information relating to its trajectory, appearance or the like, and/or pose information. Here pose information refers to information that indicates the pose of a player (e.g. the position of their limbs, the position of their centre of mass, the direction they are facing or the like). Pose information may also or alternatively indicate a result from an analysis of this information, such as the result from classifying a player's pose into one of several predetermined categories.

In some embodiments of the present disclosure the images captured by the cameras 105 during the first time period may be further analysed to obtain time information relating to each of the players 101 and 102 and the ball 103 in the first time period. In the same way as described above in relation to obtaining position information, the images may be analysed by the routing device 106, the information processing device 200 or any number of additional devices to obtain the time information. Similarly, alternative techniques for obtaining time information may be implemented as part of the present disclosure.

The information processing device 200 sorts and stores the position information and time information relating to each of the players 101 and 102 and the ball 103 in the first time period. The sorting process may comprise identifying components of the information received that correspond to certain variables. For example, the position information may comprise pose information indicating that the pose of player 101 when the ball is hit falls into a certain predetermined category. The device 200 may then store this pose information as a separate variable without performing any further analysis. In other embodiments the device 200 may perform an additional determination process in which variables are determined from one of the position information and time information. For example, the position information may comprise 'the position of player 102 at a certain time' and 'the position of player 102 one second later' from which the device 200 may determine the variable 'distance travelled by player 102 during the first time period' if the first time period is one second long. In further embodiments the device 200 may determine variables based on both the position information and the time information. Such variables may comprise, for example, information indicating the velocity of the ball at a certain time, the time taken for one of the players to hit the ball, the reaction time of a player receiving the ball or the like. The time taken to hit the ball may be defined as the duration for which the ball is identified or anticipated to be in contact with the tennis racket of the player performing a sending action, or otherwise. The time taken for a player to hit a sporting projectile may also be a variable in sports other than tennis, and may generally be defined as the duration for which the sporting projectile is identified or anticipated to be in contact with a tool that the player performing a sending action uses to propel the sporting projectile away from themselves (for example, a badminton racket). The reaction time of a player receiving the ball may be defined as the time elapsed between when the ball is hit and the point in time the player performing a receiving action starts moving towards the receiving position.

FIG. 4 is a table showing how variables from the received position information and time information are stored according to the present embodiments. Variables are grouped according to whether they relate to a player performing a sending action or a player performing a receiving action. They are further grouped according to whether they relate to player 101 or player 102, wherein 'Player 1' and 'Player 2' refer to players 101 and 102 respectively. In the columns labelled 'Player 1' and 'Player 2', an 'x' represents a stored variable.

Figure 5:
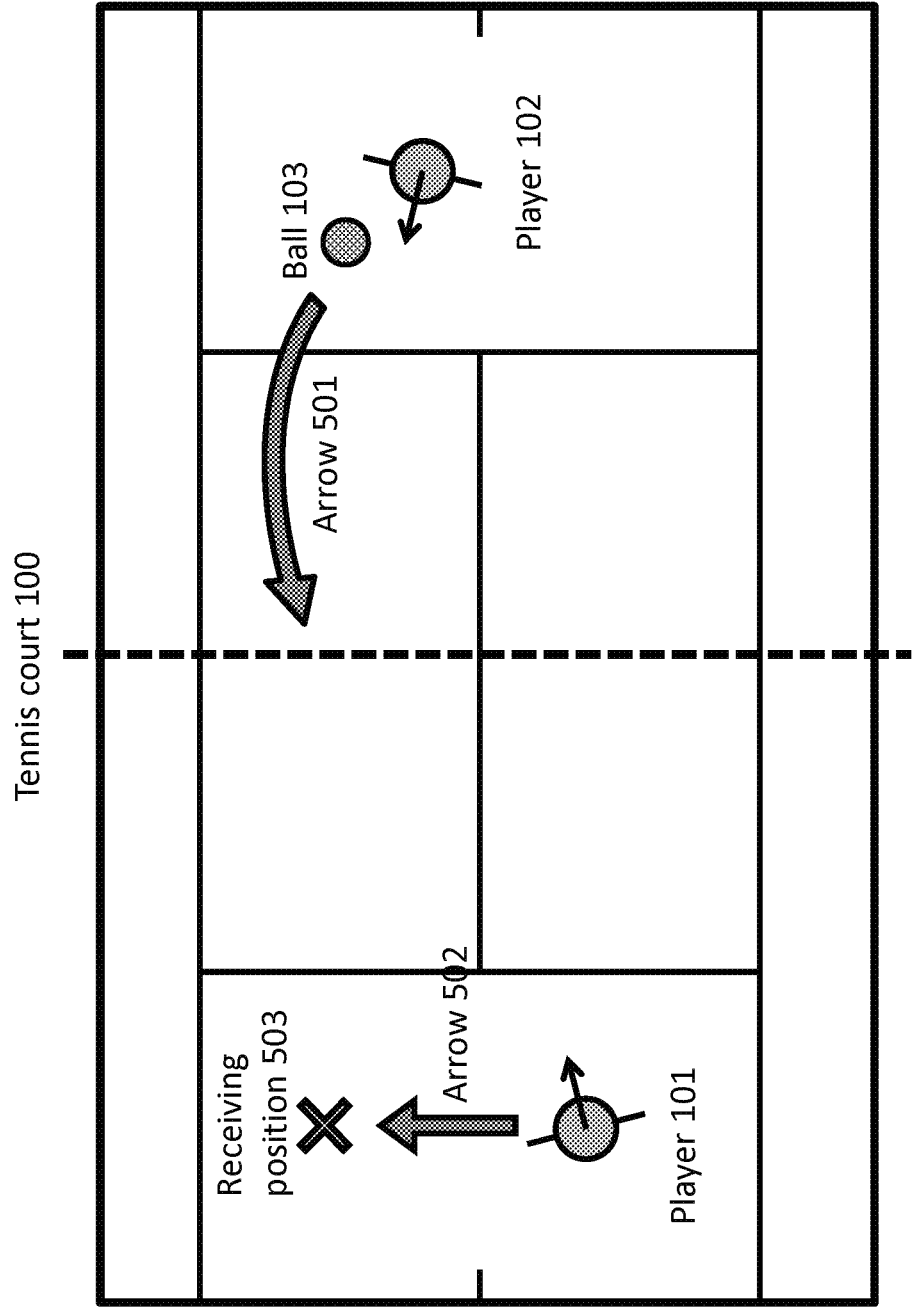
FIG. 5 shows the tennis rally from FIG. 3 during a second time period.

FIG. 5 shows the tennis rally depicted in FIG. 3 during a second time period. In the second time period, player 102 performs a sending action by hitting the tennis ball 103 with a tennis racket (not shown) and propelling the ball towards player 101. Player 101 performs a receiving action by moving to intercept the ball with the intention of hitting it back towards player 102. The arrow 501 represents the new trajectory of the ball, and the arrow 502 represents the route followed by player 101 when moving to the receiving position 503 on the court 100. In other embodiments the second time period may be, for example, the time in which one player performs both a sending action and a receiving action. This is discussed later in reference to FIG. 7 and FIG. 8.

In the same way as during the first time period, during the second time period images are captured by the plurality of cameras 105 and the corresponding image information is sent to the routing device 106 before being analysed using known image processing techniques to obtain position information relating to player 101, player 102 and the tennis ball 103. The position information may comprise any one of the examples described earlier in relation to FIG. 3. The images captured by the cameras 105 during the second time period may be further analysed by the routing device 106, the information processing device 200 or any number of additional devices to obtain time information relating to each of the players 101 and 102 and the ball 103. In various embodiments, position information and time information may be obtained and received by the information processing device 200 by the same implementations described in relation to FIG. 3. These possible implementations will therefore not be repeated.

FIG. 6 shows the table from FIG. 4, where variables from the received position information and time information relating to each of the players 101 and 102 and the ball 103 in the first time period and the second time period are stored according to embodiments. In the columns labelled 'Player 1' and 'Player 2' there is now an 'x' representing a stored variable in every available section. The skilled person will appreciate that corresponding variables associated with each of the two players have been received. For example, the distance between the ball and a player hitting the ball when this player is player 101 (during the first time period) and the distance between the ball and a player hitting the ball when this player is player 102 (during the second time period) have been received.

The information processing device 200 is configured to analyse the corresponding variables associated with each of the two players by considering the differences between them, and determine a relative performance measure between them based on this analysis. The relative performance measure, referred to from hereon as 'dominance', gives an indication of the levels of control the two players have over the progress of the game compared to one another. When determined between the two players for a particular time interval, dominance gives an indication of the levels of control the two players have over the progress of the game at a particular point or points within the game compared to one another. A greater level of control over a part of a tennis match may be indicated by, for example, a player expressing a more skillful and/or confident performance than the other player over the first and second time periods.

In some embodiments the information processing device 200 may additionally comprise a display (e.g. a liquid crystal display, LCD, or organic light-emitting diode, OLED, display) for displaying electronic information, and use this to display the dominance result to a person, for example for use in sports commentary. In further embodiments the device 200 may send a dominance result to another device via the communication interface 201.

The dominance between two players during a certain time may be expressed as two values, each associated with one of the players. In certain embodiments this may be a ratio, whereas in other embodiments the sum of the values may be a predetermined amount. For example, where player 101 is identified to express a greater level of control over the progress of the match during the first and second time periods, the dominance determined between players 101 and 102 during this time may be expressed as '4:2'. Expressing dominance in this way allows it to be quantified, therefore enabling its storage and use in calculations (e.g. calculating additional parameters) alongside other information relating to the match. Moreover, this method of expressing dominance allows people to interpret the result easily when it is displayed to a person.

In some embodiments, the information processing device 200 may determine dominance by identifying whether a result of an analysis of corresponding variables associated with each of the two players meets a predetermined condition. For example, if player reaction times during the two time periods were 0.5 s for player 101 and 0.8 s for player 102, an analysis of these two variables may produce the result that 'player 102 took 0.3 s longer to react'. This result may meet a predetermined condition that 'if player 102 takes more than 0.1 s longer to react than player 101, they are expressing less control over the progress of the match'. As a result the device 200 may determine a dominance of '2:1' between the two players, indicating that player 101 expressed a greater level of control over the progress of the match. The device 200 may determine the predetermined condition based on an analysis of data from past sport games.

In other embodiments, variables are analysed by an AI model which applies learned variable groupings to determine which of the players is most likely to win a point in the sport at a certain time. The player determined to be the most likely to win will then be assigned a higher dominance value. For example, if the model predicts that in a given time player 101 is more likely to win the point from the next shot than player 102, player 101 is determined to have a higher associated dominance value. The AI model is trained to identify which of two players is more likely to win a point at a certain time by analysing data from past games. Data from past games may include variables determined from position information and, in some embodiments, time information relating to the players and sporting projectiles in past games. Identifying which player is more likely to win a point at a certain time may be achieved by considering a number of different variables between two players and a sporting projectile and associating them with the immediate results of a point. The penultimate two time periods may be used to define which variables (and differences between variables) are more likely to lead to a player going on to win a point. The model may create groups of variables, or variable groupings, identified to most effectively categorise data by the associated likelihood of a player winning a point, and by which of the players has the highest likelihood of winning the point. Such groupings may be created by using a large set of data from past games to build a series of decisions. For example, if player 101 runs 20% further when performing a receiving action and then hits the ball between 5% and 10% faster, and also player 102 has 30% less time to return a shot, then player 101 may be determined to be more likely to win the point by a given percentage. These series of decisions are created with the goal of splitting as much of the data set into the correct categories as possible. Using data from past games allows the correct categorisation to be verified, as the outcome of a given game is known.

The present disclosure is not limited to determining dominance solely based on an analysis of corresponding variables that are each associated with a certain player. In some embodiments, dominance may be determined based on an analysis of variables that are not exclusively associated with one player (e.g. variables associated with the sporting projectile alone or variables associated with both players in equal amounts). The analysis process performed by the information processing device 200 may involve considering the differences between variables that are not each associated with a certain player with one another, or considering the differences between individual variables with a set of predetermined conditions based on an analysis of data from past sport games, for example. Variables that are not exclusively associated with one player may be obtained from position information collected over a time shorter than two time periods and may therefore contribute to the process of determining dominance before two time periods have elapsed. This is advantageous in scenarios where it is desirable to determine dominance after a time shorter than two time periods has elapsed (e.g. following a single serve in tennis) and where it is desirable to update displayed dominance values on timescales shorter than two time periods (e.g. if continuously-updating dominance values are being displayed for use in sports commentary or stored for use in post-match analysis).

In further embodiments, dominance may be determined between teams comprising more than one player each rather than between two individual players. An example of this is for a doubles tennis match. Here the dominance between two teams may be determined based on an analysis of corresponding variables associated with each of four players. The information processing device 200 may group these variables according to the teams of the associated players. In these embodiments the first time period may be the time in which one player on a first team performs a sending action and two players on a second team each perform a receiving action. The second time period may be the time in which one player on the second team performs a sending action and two players on the first team each perform a receiving action. The device 200 may then analyse variables that are associated with the player on the first team who performed a sending action during the first time period with corresponding variables associated with the player on the second team who performed a sending action during the second time period. The device 200 may further analyse variables that are associated with each of the two players on the first team who performed a receiving action during the first time period with corresponding variables associated with each of the two players on the second team who performed a receiving action during the second time period.

The information processing device 200 may weight contributions from different analyses of variables differently when determining dominance. The contributions weighted more highly may involve variables indicating qualities that can be used to produce a particularly accurate dominance result, either by contributing to or being correlated with such qualities (based on data from past games). A quality may be indicated by more than one variable. A variable may indicate any number of qualities, each of which may or may not be related to the player the variable is associated with. For instance, it is possible for a variable associated with a particular player to indicate the level of control over the progress of the game possessed by another player. As an example, both the distance between the sporting projectile and a player hitting the sporting projectile (indicating how far they had to stretch in order to hit the sporting projectile from their position) and the distance between the sporting projectile and a player receiving the sporting projectile at a time when the sporting projectile is hit may indicate a level of skill of the player hitting the sporting projectile and/or their level of control over its trajectory.

Since dominance is a relative measure, a variable associated with a particular player may indicate a level of control over the progress of the game for more than one player. For example, the distance travelled by a player receiving the sporting projectile may indicate a level of skill of both the player performing the receiving action and the player performing a sending action. A tennis player for example may express a skillful performance by forcing their opponent to travel a large distance to reach the tennis ball, but the opponent may express a skillful performance by travelling the large distance and successfully returning the ball. Similarly, the spin or velocity of the sporting projectile at a time just before/after the player hits the ball may indicate a level of skill of a player performing a sending action (e.g. by indicating a level of control over the trajectory of the sporting projectile or the power with which it was propelled, respectively) but also may indicate a level of skill of a player receiving the sporting projectile. The distance between the sporting projectile and a player performing a receiving action at a time when the sporting projectile first bounces after being hit by a player performing a sending action may indicate a high level of skill of the player performing the sending action but also a low level of control over the match of the player receiving the sporting projectile.

Other variables include the time taken for a player to hit the sporting projectile, which may indicate a level of control over the trajectory of the sporting projectile possessed by a player performing a sending action. For example, in tennis this variable may indicate whether a tennis swing is similar to past tennis swings that have resulted in positive outcomes, such as high levels of control over tennis ball trajectory, based on data from previous tennis matches. Pose information may similarly indicate a level of skill of a player based on data from past games, e.g. indicating a level of skill of a tennis player performing a sending action based on the appearance of the player's swing. The level of confidence of a player at a certain time may be indicated by pose information in this way, or by other variables such as those relating to the reaction time of the player. In a final example, the distance between the sporting projectile and one of the players at a certain time may indicate the level of control over the trajectory of the sporting projectile that the player possesses at that time. This can then be compared to the level of control over the sporting projectile possessed by the other player at a corresponding time.

Once determined, the dominance between two players of a sport during a time interval can be used to retroactively determine whether a certain action of one of the players was made under pressure from (in other words, forced by) the other player. An action of a player may be defined as being made under pressure if it is determined that the performance of the action was heavily influenced by another player performing another action. In some embodiments, an action may be defined as being made under pressure if it is further determined that the action was performed in a manner identified (e.g. by meeting a number of predetermined parameters) to be undesirable to the player (e.g. difficult to achieve).

When a player fails to complete an action or performs an action in a manner identified to be undesirable, this may be referred to as making an error. An example of this is when a tennis player performing a receiving action fails to reach a receiving position quickly enough to hit the ball. Here it may be identified that the error was made under pressure from the tennis players' opponent if it is determined that the error was more heavily influenced by the opponent performing a sending action particularly skillfully than by the player performing the receiving action particularly unskillfully. In this scenario the dominance determined between the player and their opponent most recently may be used to identify whether the error was made under pressure. The most recently determined dominance may be the dominance between the players during the two time periods immediately preceding the time of the error. If this dominance result indicates that the player performing the receiving action expressed a greater level of control over the progress of the tennis match during that time, it may be determined that the error was not made under pressure from their opponent. Similarly, if this dominance result instead indicates that the opponent player expressed a greater level of control over the progress of the match during that time it may be identified that the error was made under pressure. The information processing device 200 may perform this determination process to identify whether an error is made under pressure. In other embodiments, the device 200 may display the most recently determined dominance result to a person who identifies whether an error was made under pressure. In further embodiments the device 200 may send the dominance result to another device or devices via the communication interface 201. The other device or devices may then identify whether an error was made under pressure or display the result to a person who identifies whether the error was made under pressure.

As previously mentioned, the most recently determined dominance may be the dominance between the players during the two time periods immediately preceding the time of the error. Dominance results may therefore be produced at frequent intervals using information from a rolling window of time that consists of the previous two time periods and is constantly updated. In some embodiments, information stored that corresponds to previous time periods may be discarded by the information processing device 200 (e.g. by writing over variables when the same variables associated with the same player are received again). For example, after a new time period occurs variables from the previous first time period may be discarded whilst the previous second time period becomes the new first time period. The information received and/or the variables obtained from earlier time periods may also or alternatively be sent to another device or devices by the communication interface 201. In further embodiments a dominance result may be sent to another device or devices by the communication interface 201, e.g. every predetermined number of time periods or after every new result is determined.

Retroactively determining whether an action of a player in a sport was made under pressure from another player may be desirable in applications such as automatic point-scoring, live sports commentary, post-match analysis or the like. However, the present disclosure is not limited to determining dominance for this use and may be implemented for other purposes. For example, dominance results may be directly displayed by the information processing device 200 or sent to another device for use in the applications listed above.

In further embodiments, the information processing device 200 may send dominance results to another device in order for the results to be stored as metadata for videos of the sports match. The device 200 may be configured to send additional information to the other device indicating the times during the match that the dominance results relate to. The device 200 may alternatively send the dominance results to the other device in a certain arrangement in time, where the arrangement can be used to determine the times during the match that the results relate to (e.g. sending the dominance results at a predetermined time after the first and second time periods). The other device may then store the dominance results as metadata for videos of the sports match by associating the results with temporal portions of the videos that correspond to the times during the match that the dominance results relate to. This allows match highlight clips (compilations of certain video portions from videos of the match) to be generated quickly and automatically, by allowing temporal portions of the videos to be categorised by the associated dominance results. For example, video portions corresponding to times during a tennis match where the dominance between two players meets the condition that the two dominance values have a difference greater than 2 may be identified automatically and compiled to produce match highlight clips. This process is significantly quicker and more convenient than producing match highlight clips by employing a person to review individual videos, identify suitable portions and compile them manually.

Figure 7:
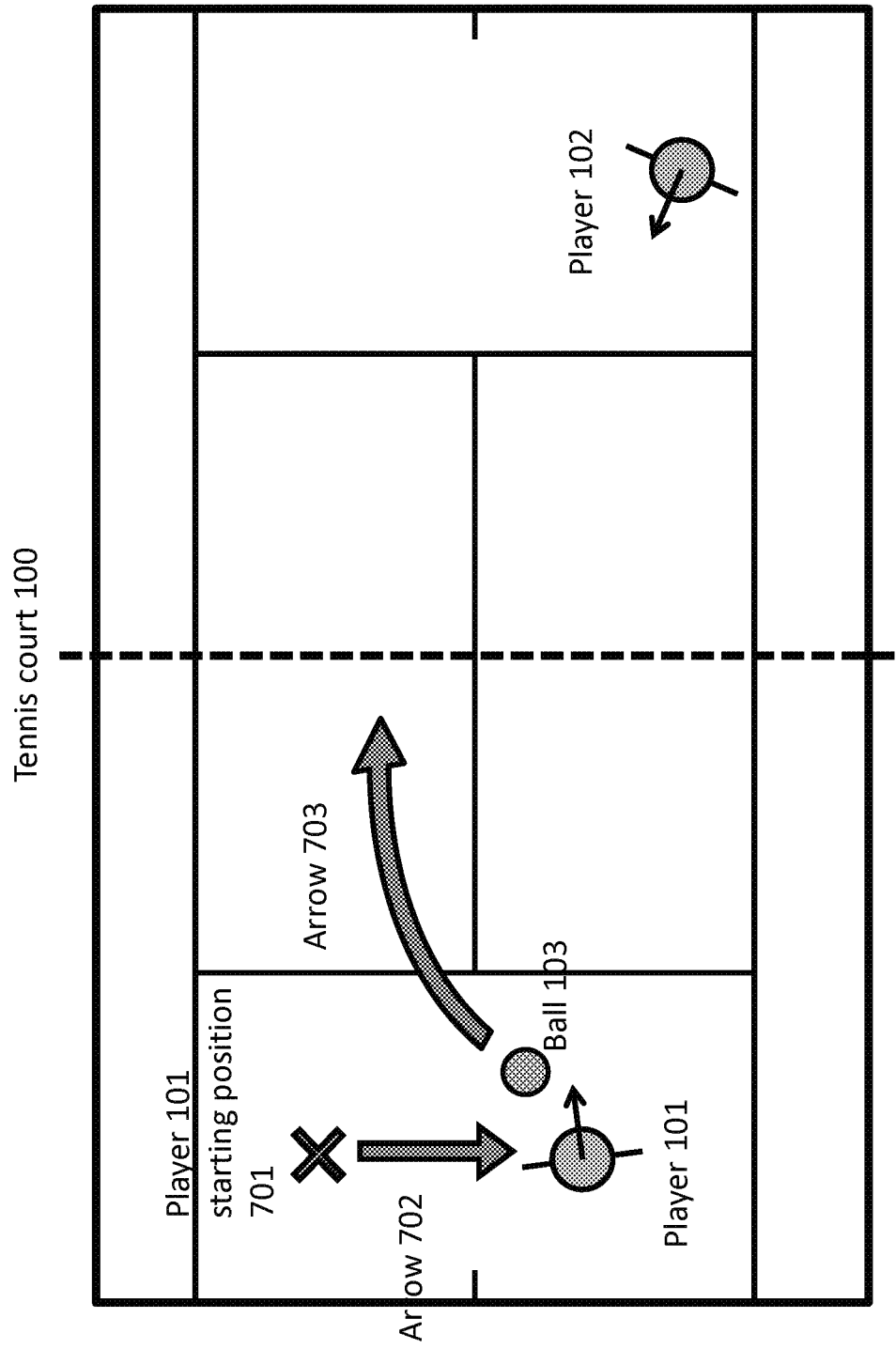
FIG. 7 shows a tennis rally between players on the court during an alternate first time period.

The first and second time periods are not limited to those described in reference to FIG. 3-FIG. 6. Either or both time periods may be, for example, the time in which a player performs both a sending action and a receiving action. This is illustrated in FIG. 7, which shows a tennis rally between players 101 and 102 on the court 100 during an alternate first time period according to further embodiments. Here the first time period is the time in which player 101 performs both a receiving action and a sending action. Player 101 performs a receiving action by running to intercept the tennis ball 103 with the intention to hitting it back towards player 102 with a tennis racket (not shown). The motion of player 101 follows the route represented by arrow 702 from a starting position 701 on the court. Player 101 then performs a sending action as intended by swinging the tennis racket and hitting the tennis ball 103 with the racket, propelling the ball towards player 102. The arrow 703 represents the trajectory of the ball 103.

In these embodiments, position information (and, in some embodiments, time information) relating to each of the players 101 and 102 and the ball 103 in the first time period may be obtained from information collected during the first time period, received by the information processing device 200 and then sorted and stored by the device 200 by the same methods as those described earlier in reference to FIG. 3. FIG. 8 is a table showing how variables from received position information and time information may be stored by the device 200 according to the present embodiments. Variables are grouped in the same way as shown in FIG. 4, wherein 'Player 1' and 'Player 2' again refer to players 101 and 102 respectively and an 'x' represents a stored variable. The skilled person will appreciate that variables associated with only one of the two players (player 101) have been received after the first time period. The second time period may then be the time in which player 102 performs a receiving action and a sending action, after which corresponding variables associated with player 102 will received. The device 200 may then analyse corresponding variables associated with each of the two players and determine the dominance between them during the first and second time periods based on this analysis, as described above.

Figure 9:
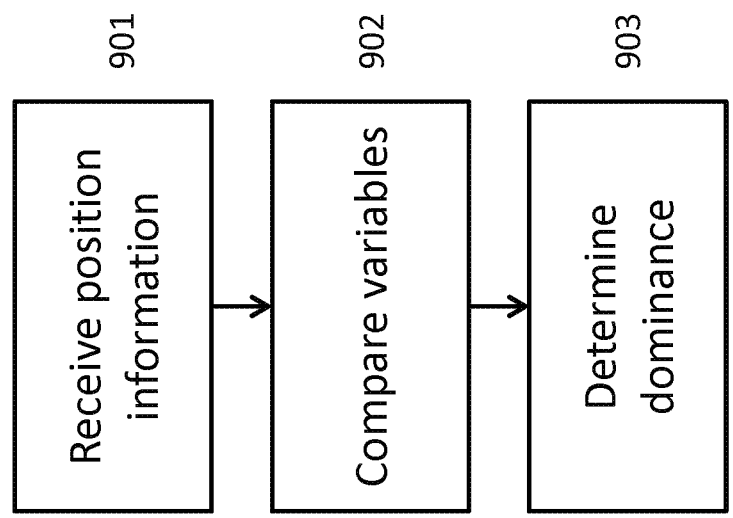
FIG. 9 shows a method according to embodiments.

FIG. 9 shows a method according to embodiments of the present disclosure. This method may be carried out by the information processing device 200 shown in FIG. 2.

At step 901, position information is received that relates to each of the players and a sporting projectile as each player hits or receives the sporting projectile. For example, position information comprising information that indicates the distance travelled by player 102 receiving the ball 103 during a first time period and information that indicates the distance travelled by player 101 receiving the ball 103 during a second time period is received by device 200.

At step 902, an analysis of the position information is performed. For example, the device 200 obtains the corresponding variables 'distance moved to a receiving position by player 101' and 'distance moved to a receiving position by player 102' from the position information and considers the differences between them, producing the result 'during the first and second time periods, the distance moved to a receiving position by player 101 was, say, 0.8 m shorter than the distance moved to a receiving position by player 102'.

At step 903, a relative performance measure between the players known as dominance is determined based on an analysis of the position information. For example, the device 200 determines that the above result meets the predetermined condition that 'if the distance moved to a receiving position by player 101 is more than, say, 0.5 m shorter than the distance moved to a receiving position by player 102 during the first and second time periods, player 102 is expressing a level of control over the progress of the match that is twice as great as the level of control over the progress of the match expressed by player 101'. As a result, the device 200 determines a dominance of '1:2' between the two players.

In another embodiment of the present disclosure, the device 200 analyses variables using a statistical model that can classify a sending action in a sport as 'returnable' or 'unreturnable'. Such a sending action is referred to here as a 'shot'. A returnable shot is defined as a shot where the likelihood of a receiving player successfully performing the receiving action and hitting the tennis ball back is greater than the likelihood of the receiving player failing to perform the receiving action successfully (e.g. failing to reach the ball in time to hit it) and/or failing to hit the tennis ball back (e.g. successfully hitting the tennis ball, but hitting it out of the court) by a predetermined margin. An unreturnable shot is defined as a shot where the likelihood of the receiving player failing to perform the receiving action successfully and/or failing to hit the ball back is greater than the likelihood of the receiving player performing the receiving action successfully and hitting the ball back by a predetermined margin. The statistical model may be trained to associate certain groups of variables with a certain classification of tennis shot by using data from past tennis games in the same way as the AI model described above. That is, a number of different variables relating to two players and a sporting projectile are considered and associated with the immediate results of a point. The predetermined margin or margins may be defined based on past data. For example, a predetermined margin may be chosen to be a value identified to most effectively classify past shots.

Variables analysed in such a statistical model may be determined from position information and, in some embodiments, time information relating to the players and sporting projectiles in past games, or any relevant information. Specifically, variables may include the position, velocity and/or acceleration of the ball, the player hitting the ball and/or the player receiving the ball when the ball is hit; the speed, momentum and/or spin of the ball at a time directly after being hit; the handedness of the player hitting the ball and/or the player receiving the ball; the reaction time of the receiving player; the displacement of the player receiving the ball; and the height of the ball at a time when the ball is identified to be the peak of its trajectory. Variables may further include the position, velocity and acceleration of the ball at a time when the ball is identified to be directly over the net; the trajectory of the ball relative to the net; the distance between the ball and the net when the ball is directly over the net; the time between when the ball is hit and when the ball is directly over the net; and the time between when the ball is directly over the net and when the ball reaches the receiving player. Additional variables which may be used include the position, velocity and acceleration of the ball when the ball first bounces; the distance between the ball and the player receiving the ball when the ball first bounces; and the trajectory of the ball before and after it first bounces, including the angle at which it first bounces.

In a similar way to the dominance results discussed above, the classification of a shot as returnable or unreturnable may be used to determine whether an error made by a tennis player was made under pressure from another player. If a tennis player hits the ball out when the preceding shot is classified as returnable, the error made is determined to be 'unforced'. In other words, the player hitting the ball out is identified to have not made the error under pressure from the opposing player. However, if the preceding shot was classified as unreturnable, the error is determined to be 'forced', or made under pressure from the opposing player.

Figure 10:
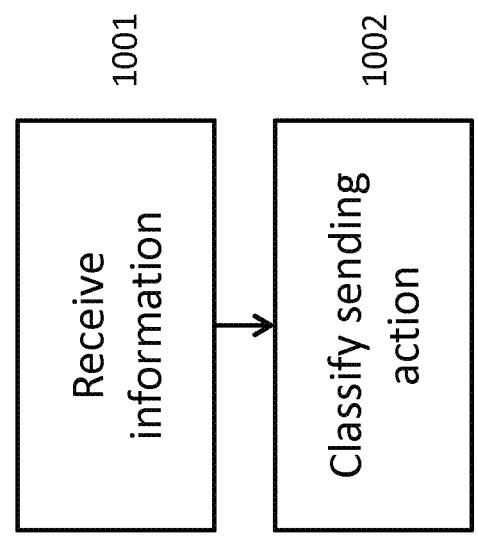
FIG. 10 shows another method according to embodiments.

FIG. 10 shows another method according to embodiments of the present disclosure, for classifying a sending action of a player in a sport. This method may be carried out by the information processing device 200 shown in FIG. 2.

At step 1001, information is received that relates to the player performing the sending action, at least one other player in the sport, and the sporting projectile as each player hits or receives the sporting projectile. For example, the device 200 receives position information comprising information that indicates the speed of the ball at a time directly after being hit by the player performing the sending action and information that indicates the distance between the ball and the player receiving the ball when the ball first bounces.

At step 1002, the sending action is classified as returnable or unreturnable based on an analysis of the information by a statistical model. The statistical model may be trained to associate certain groups of variables with a certain classification of tennis shot. For example, the sending action is classified as unreturnable based on the result that the speed of the ball at a time directly after being hit by the player performing the sending action is faster than 100 miles per hour and the distance between the ball and the player receiving the ball when the ball first bounces is greater than 3 metres. This association may be based on data from past games.

Embodiments of the disclosure are provided in the following numbered clauses:

1) A method for determining a relative performance measure between at least two players in a sport, comprising:
   Receiving position information relating to each of the players and a sporting projectile as each player hits or receives the sporting projectile, and
   Determining, based on an analysis of the position information, the relative performance measure between the players.
2) A method according to clause 1, wherein the position information comprises information that indicates the distance between the sporting projectile and one of the players.
3) A method according to any preceding clause, wherein the position information comprises information that indicates the distance between the sporting projectile and the player hitting the sporting projectile.
4) A method according to any preceding clause, wherein the position information comprises information that indicates the distance between the sporting projectile and the player receiving the sporting projectile when the sporting projectile is hit by the/a player hitting the sporting projectile.
5) A method according to any preceding clause, wherein the position information comprises information that indicates the distance travelled by a player when receiving the sporting projectile.
6) A method according to any preceding clause, wherein the position information comprises information that indicates the spin on the sporting projectile when the sporting projectile is hit.
7) A method according to any preceding clause, wherein the position information comprises pose information that indicates the pose of a player.
8) A method according to any preceding clause, wherein the method further comprises:
   Receiving time information relating to each of the players and the sporting projectile as each player hits or receives the sporting projectile,
   Determining, based on the position information and the time information, the velocity of the sporting projectile, and
   Wherein the relative performance measure is determined based on an analysis of velocity of the sporting projectile.
9) A method according to any preceding clause, wherein the method further comprises:
   Receiving time information relating to each of the players and the sporting projectile as each player hits or receives the sporting projectile,
   Determining, based on the position information and the time information, the time taken for a player to hit the sporting projectile, and
   Wherein the relative performance measure is determined based on a comparison of the time taken for a player to hit the sporting projectile.
10) A method according to any preceding clause, wherein the method further comprises determining a value associated with each of the players based on the relative performance measure, wherein the sum of the values is a predetermined amount.
11) A method according to clause 10, wherein the method further comprises displaying the value associated with each of the players.
12) A method according to clause 10, wherein the method further comprises sending the values to another device.
13) A method according to clause 1, wherein the sport is tennis and the sporting projectile is a tennis ball.
14) A method according to clause 13, wherein the relative performance measure is determined at the end of a point.
15) A method according to clause 14, wherein the relative performance measure is used to determine a point.
16) A method according to any preceding clause, wherein the analysis of the position information is performed by an AI model that creates variable groupings based on position information from previous sport games.
17) A method for classifying a sending action of a player in a sport, wherein the sending action comprises moving to propel a sporting projectile away from themselves, comprising:
   receiving information relating to the player, at least one other player in the sport, and the sporting projectile as each player hits or receives the sporting projectile; and
   classifying the sending action, based on an analysis of the information by a statistical model, as returnable or unreturnable.
18) A method according to clause 17, wherein the information is position information or time information.
19) An apparatus for determining a relative performance measure between at least two players in a sport, comprising:
   Communication circuitry configured to receive position information relating to each of the players and a sporting projectile as each player hits or receives the sporting projectile, and
   Circuitry configured to determine, based on an analysis of the position information, the relative performance measure between the players.
20) A computer program comprising computer readable instructions which, when loaded onto a computer, configures the computer to perform a method according to any one of clauses 1 to 18.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method for determining a relative performance measure between at least two players in a sport, comprising:
   receiving, from a plurality of cameras surrounding the at least two players, a plurality of images of the at least two players and a sporting projectile used by the at least two players in the sport as image information;
   receiving audio information corresponding to the at least two players in the sport and a sporting projectile used by the at least two players in the sport;
   receiving global positioning information corresponding to the at least two players and a sporting projectile used by the at least two players in the sport;
   determining position information, by applying an analyzing algorithm on the image information using processing circuitry, audio information, and global positioning information, relating to each of the at least two players and the sporting projectile as each player hits or receives the sporting projectile;
   determining, based on an analysis of the position information and using the processing circuitry, the relative performance measure between the players, the performance measure indicating a dominance one player has over the other player of the at least two players; and
   reporting the determined performance measure such that at least one of the at least two players is able to improve performance based on the reported performance measure,
   wherein the performance measure includes an amount of time that the one player is in a position of control over the sporting projectile with respect to the other player.

2. The method according to claim 1, wherein the position information comprises information that indicates the distance between the sporting projectile and one of the players.

3. The method according to claim 1, wherein the position information comprises information that indicates the distance between the sporting projectile and the player hitting the sporting projectile.

4. The method according to claim 1, wherein the position information comprises information that indicates the distance between the sporting projectile and a respective one of the at least two players receiving the sporting projectile when the sporting projectile is hit by a respective one of the at least two players hitting the sporting projectile.

5. The method according to claim 1, wherein the position information comprises information that indicates the distance travelled by a player when receiving the sporting projectile.

6. The method according to claim 1, wherein the position information comprises information that indicates a spin on the sporting projectile when the sporting projectile is hit.

7. A method according to claim 1, wherein the position information comprises pose information that indicates a pose of a player.

8. The method according to claim 1, wherein the method further comprises:
   receiving time information relating to each of the players and the sporting projectile as each player hits or receives the sporting projectile,
   determining, based on the position information and the time information, a velocity of the sporting projectile, and
   wherein the relative performance measure is determined based on an analysis of velocity of the sporting projectile.

9. The method according to claim 1, wherein the method further comprises:
   receiving time information relating to each of the players and the sporting projectile as each player hits or receives the sporting projectile,
   determining, based on the position information and the time information, a time taken for a player to hit the sporting projectile, and
   wherein the relative performance measure is determined based on a comparison of the time taken for a player to hit the sporting projectile.

10. The method according to claim 1, wherein the method further comprises determining a value associated with each of the players based on the relative performance measure, wherein a sum of the values is a predetermined amount.

11. The method according to claim 10, wherein the method further comprises displaying the value associated with each of the players.

12. The method according to claim 10, wherein the method further comprises sending the values to another device.

13. The method according to claim 1, wherein the sport is tennis and the sporting projectile is a tennis ball.

14. The method according to claim 13, wherein the relative performance measure is determined at an end of a point.

15. The method according to claim 14, wherein the relative performance measure is used to determine a point.

16. The method according to claim 1, wherein the analysis of the position information is performed by an artificial intelligence (AI) model that creates variable groupings based on position information from previous sport games.

17. A non-transitory computer-readable medium including computer readable instructions which, when loaded onto a computer, configures the computer to perform a method according to claim 1.

18. An apparatus for determining a relative performance measure between at least two players in a sport, comprising:
  circuitry configured to
    receive, from a plurality of cameras surrounding the at least two players, a plurality of images of the at least two players and a sporting projectile used by the at least two players in the sport as image information,
    receiving audio information corresponding to the at least two players in the sport and a sporting projectile used by the at least two players in the sport;
    receiving global positioning information corresponding to the at least two players and a sporting projectile used by the at least two players in the sport;
    determine position information, by applying an analyzing algorithm on the image information, audio information, and global positioning information, relating to each of the players and the sporting projectile as each player hits or receives the sporting projectile,
    determine, based on an analysis of the position information, the relative performance measure between the players, the performance measure indicating a dominance one player has over the other player of the at least two players, and
    report the determined performance measure such that at least one of the at least two players is able to improve performance based on the reported performance measure,
    wherein the performance measure includes an amount of time that the one player is in a position of control over the sporting projectile with respect to the other player.

\* \* \* \* \*